(12) United States Patent
Ihara (10) Patent No.: US 8,805,084 B2
(45) Date of Patent: Aug. 12, 2014

(54) IMAGE PROCESSING APPARATUS, IMAGE PROCESSING METHOD, AND NON-TRANSITORY COMPUTER READABLE MEDIUM STORING PROGRAM

(75) Inventor: Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/542,231

(22) Filed: Jul. 5, 2012

(65) Prior Publication Data

US 2013/0148896 A1 Jun. 13, 2013

(30) Foreign Application Priority Data

Dec. 13, 2011 (JP) ................................. 2011-271816

(51) Int. Cl.
*G06K 9/46* (2006.01)
*G06K 9/66* (2006.01)

(52) U.S. Cl.
USPC .......................................... 382/195; 382/218

(58) Field of Classification Search
CPC ....................................................... G06K 9/46
USPC ........... 382/190, 195, 218, 305; 715/213, 255
See application file for complete search history.

(56) References Cited

U.S. PATENT DOCUMENTS

| 7,508,998 B2 * | 3/2009 | Shiiyama | 382/305 |
| 8,260,061 B2 * | 9/2012 | Hirohata | 382/218 |
| 8,584,009 B2 * | 11/2013 | Ota et al. | 715/255 |
| 2005/0102139 A1 * | 5/2005 | Fukada | 704/235 |
| 2006/0204079 A1 * | 9/2006 | Yamaguchi | 382/154 |
| 2013/0148896 A1 * | 6/2013 | Ihara | 382/195 |

FOREIGN PATENT DOCUMENTS

JP A-2002-109518 4/2002

* cited by examiner

*Primary Examiner* — Gregory M Desire
(74) *Attorney, Agent, or Firm* — Oliff PLC (57) ABSTRACT

An image processing apparatus includes an image acquisition unit that acquires a first image and a second image each of which includes a character string, an extraction unit that extracts feature points included in each of the first image and the second image, a setting unit that sets partial regions including characters which are continuously arranged in an arrangement direction of the character string in each of the first image and the second image, and a specification unit that compares positions of the feature points included in the partial regions set in the first image with positions of the feature points included in the partial regions set in the second image so as to specify the partial regions set in the second image corresponding to the partial regions set in the first image, and specifies corresponding points in each of the specified partial regions.

9 Claims, 14 Drawing Sheets

IMAGE PROCESSING APPARATUS, IMAGE PROCESSING METHOD, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2011-271816 filed Dec. 13, 2011.

BACKGROUND (i) Technical Field

The present invention relates to an image processing apparatus, an image processing method, and a non-transitory computer readable medium storing a program.

(ii) Related Art

When a position or a posture of a camera is known, there is a technique where corresponding points of plural images captured by the camera are detected.

SUMMARY

According to an aspect of the invention, there is provided an image processing apparatus including an image acquisition unit that acquires a first image and a second image each of which includes a character string; an extraction unit that extracts feature points included in each of the first image and the second image; a setting unit that sets one or plural partial regions including plural characters which are continuously arranged in an arrangement direction of the character string in each of the first image and the second image; and a specification unit that compares positions of the feature points included in the partial regions set in the first image by the setting unit with positions of the feature points included in the partial regions set in the second image by the setting unit so as to specify the partial regions set in the second image corresponding to the partial regions set in the first image, and specifies corresponding points in each of the specified partial regions.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention (hereinafter, referred to as exemplary embodiments) will be described with reference to the drawings.

Figure 1:
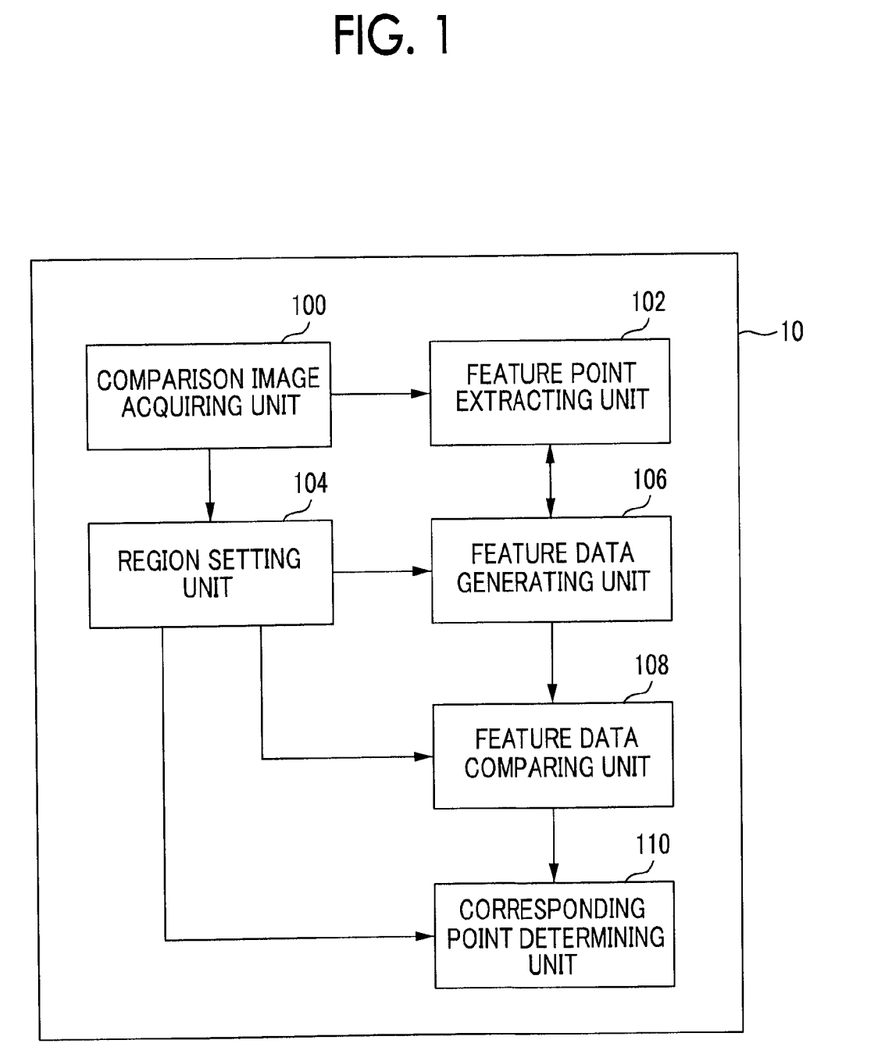
FIG. 1 is a functional block diagram of an image processing apparatus according to the exemplary embodiment.

FIG. 1 is a functional block diagram of an image processing apparatus 10 according to the exemplary embodiment. As shown in FIG. 1, the image processing apparatus 10 includes a comparison image acquiring unit 100, a feature point extracting unit 102, a region setting unit 104, a feature data generating unit 106, a feature data comparing unit 108, and a corresponding point determining unit 110.

A computer which includes a controller such as a CPU, a storage device such as a memory, an input and output unit transmitting and receiving data to and from an external device, and the like may read a program from a computer readable information storage medium so as to be executed, thereby realizing functions of the respective units provided in the image processing apparatus 10. In addition, the program may be supplied to the image processing apparatus 10 which is a computer using an information storage medium such as an optical disc, a magnetic disk, a magnetic tape, a magneto-optical disc, or a flash memory, or may be supplied to the image processing apparatus 10 via a data communication network such as the Internet.

The comparison image acquiring unit 100 acquires plural images to be compared. The comparison image acquiring unit 100 may acquire images read by a scanner (not shown) or images captured by a camera (not shown) as data to be compared, or may acquire images stored in an external device or a memory as data to be compared. In addition, in the examples described below, it is assumed that the comparison image acquiring unit 100 acquires a first image and a second image as comparison targets. Further, the comparison image acquiring unit 100 may acquire three or more images as comparison targets, and, in this case, any two of the acquired plural images may be sequentially selected as a first image and a second image, and the same process as in the following may be performed for each set.

Figure 2A:
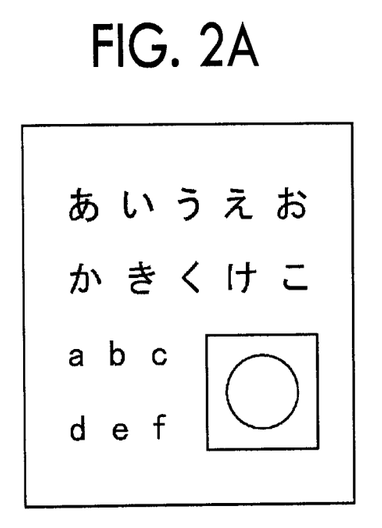
FIGS. 2A and 2B are diagrams illustrating examples of the first image (2A) and the second image (2B)
Figure 2B:
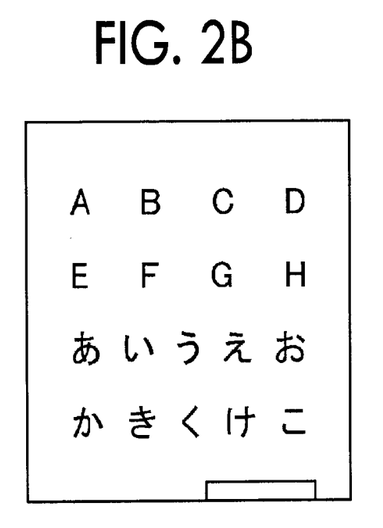

FIGS. 2A and 2B shows examples of the first image (2A) and the second image (2B) acquired by the comparison image acquiring unit 100. As shown in FIGS. 2A and 2B, the images compared by the comparison image acquiring unit 100 include character strings. In addition, the character strings may be in horizontal writing or vertical writing.

The feature point extracting unit 102 extracts feature points from each of the first image and the second image acquired by the comparison image acquiring unit 100. The feature point extracting unit 102 may extract the feature points from the entire image or may extract the feature points from a designated partial region. For example, the feature point extracting unit 102 may extract feature points from a target image (region) using a feature point detection technique such as a corner detection method (Harris Corner or the like) or SIFT (Scale-Invariant Feature Transform).

Figure 3A:
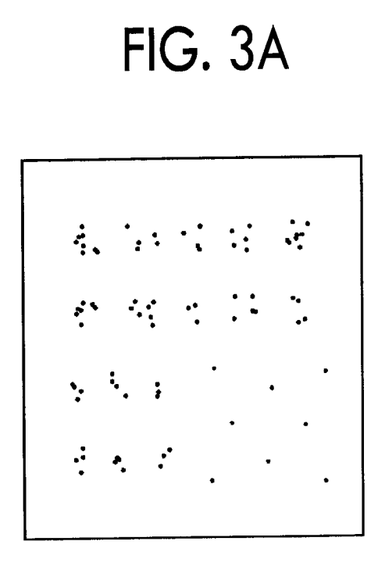
FIGS. 3A and 3B are diagrams illustrating examples of feature points extracted from the first image and the second image.
Figure 3B:
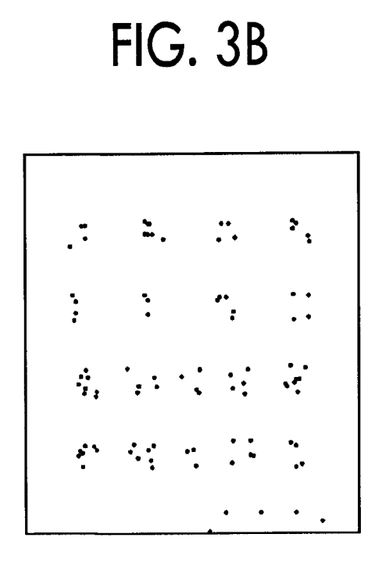

FIGS. 3A and 3B show examples of the feature points extracted from the first image and the second image by the feature point extracting unit 102. As shown in FIGS. 3A and 3B, the feature points are distributed along the rows in horizontal writing and are distributed along the columns in vertical writing.

The region setting unit 104 determines an arrangement direction of the character string for the first image and the second image and sets an arranged region (a row region in horizontal writing, and a column region in vertical writing) including continuous characters in the determined arrangement direction. Hereinafter, a detailed description will be made of a process where the region setting unit 104 sets an arranged region in the target image (the first image or the second image)

Figure 4:
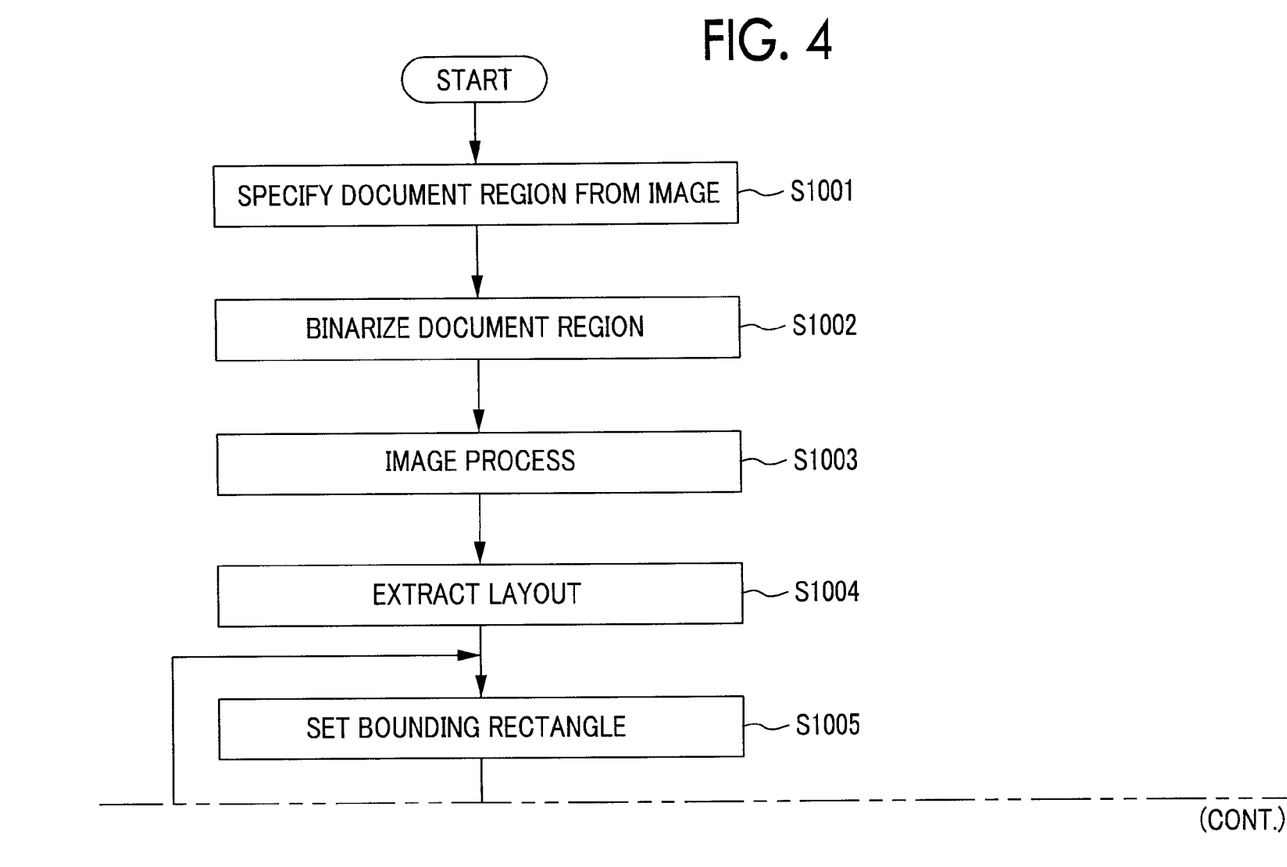
FIG. 4 is a flowchart illustrating a row region setting process.

FIG. 4 is a flowchart illustrating a row region setting process of setting a row region in the first image. As shown in FIG. 4, the region setting unit 104 specifies a document region in the target image (S1001) and binarizes the specified document region (S1002). The specification of the document region may be performed, for example, by specifying a region where the number of colors is two.

The region setting unit 104 performs image processes such as an enlargement or reduction process, a noise removal process, and a process of connecting adjacent black pixels to each other, for the binarized document region (S1003), and extracts layouts of black pixel groups (S1004)

The region setting unit 104 sets a bounding rectangle in layouts which are not processed of the layouts extracted in step S1004 (S1005), and compares the distance (W) between the adjacent bounding rectangles in the transverse direction and the distance (H) between the adjacent bounding rectangles in the longitudinal direction (S1006). If W<H (S1006: Y), horizontal writing is determined (S1007), and a row region is set by connecting the bounding rectangles to each other in the direction of the character string (S1008). In addition, the region setting unit 104 determines vertical writing (S1009) if W≥H (S1006: N), and sets a column region by connecting the bounding rectangles to each other in the direction of the character string (S010).

The region setting unit 104 returns to step S1005 if black pixels which are not processed are left except for the set row region or column region (S1011: Y), and finishes the process if black pixels which are not processed are not left except for the set row region or column region (S1011: N).

Figure 5:
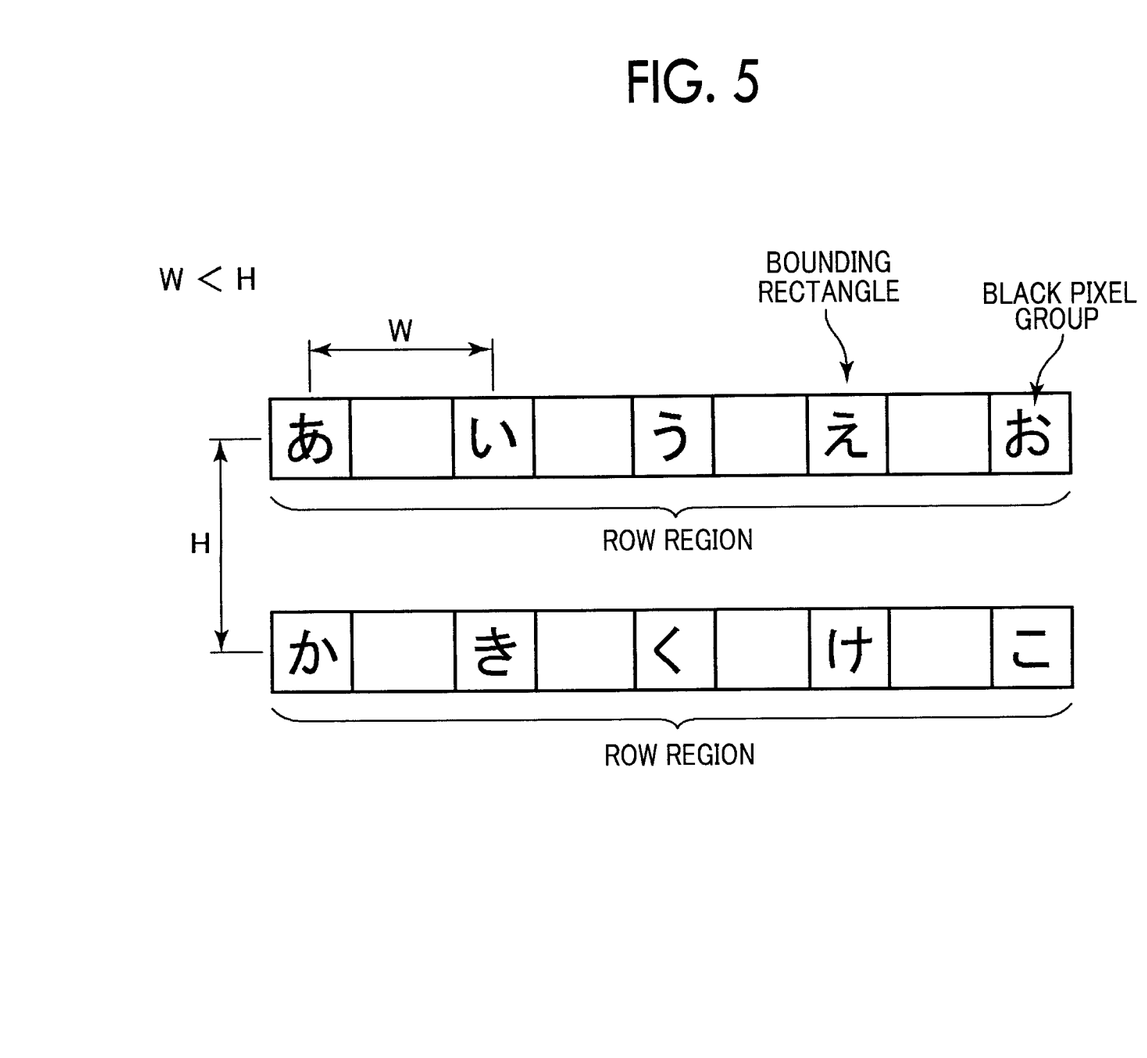
FIG. 5 is a diagram illustrating a row region setting example.

FIG. 5 shows a setting example of the row region. In the example shown in FIG. 5, the distance W between the bounding rectangles in the transverse direction is smaller than the distance H between the bounding rectangles in the longitudinal direction, set in the black pixel groups, and thus the row region is set by connecting the bounding rectangles in the transverse direction.

The feature data generating unit 106 generates feature data for each arranged region on the basis of positions of the feature points included in the arranged regions set by the region setting unit 104. Specifically, the feature data generating unit 106 sets a reference line for each arranged region, and generates feature data on the basis of a positional relationship between the reference line and the feature points. Hereinafter, a setting example of the reference line will be described in detail.

Figure 6A:
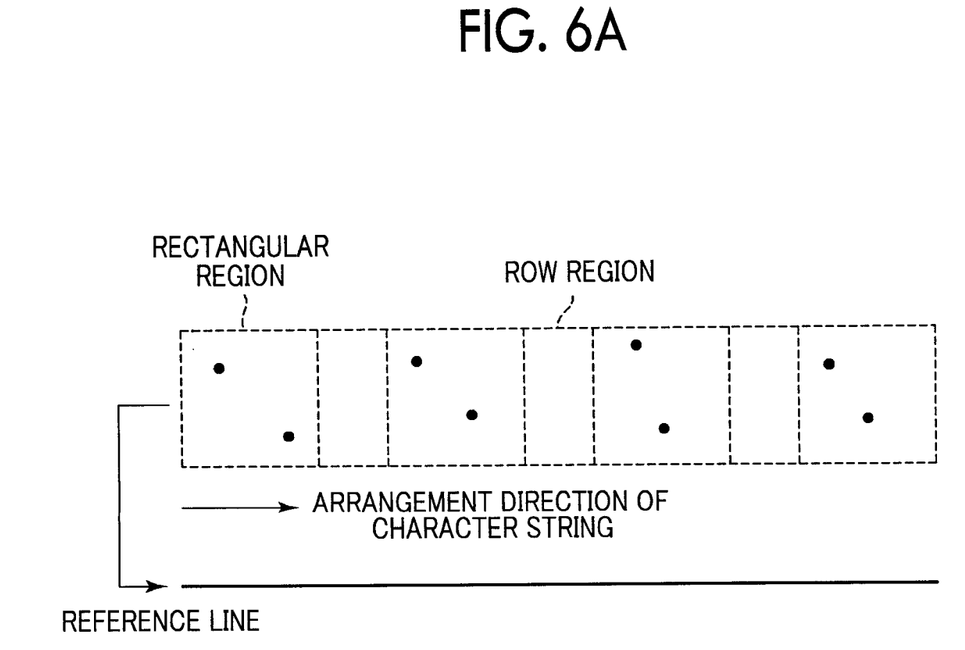
FIG. 6A is a diagram illustrating a first setting example of the reference line.

FIG. 6A is a diagram illustrating a first setting example of the reference line. In the example shown in FIG. 6A, since the arranged region is a row region (that is, horizontal writing), the reference line is set in the horizontal direction, but the reference line may be set in the vertical direction in a case where the arranged region is a column region (that is, vertical writing).

Figure 6B:
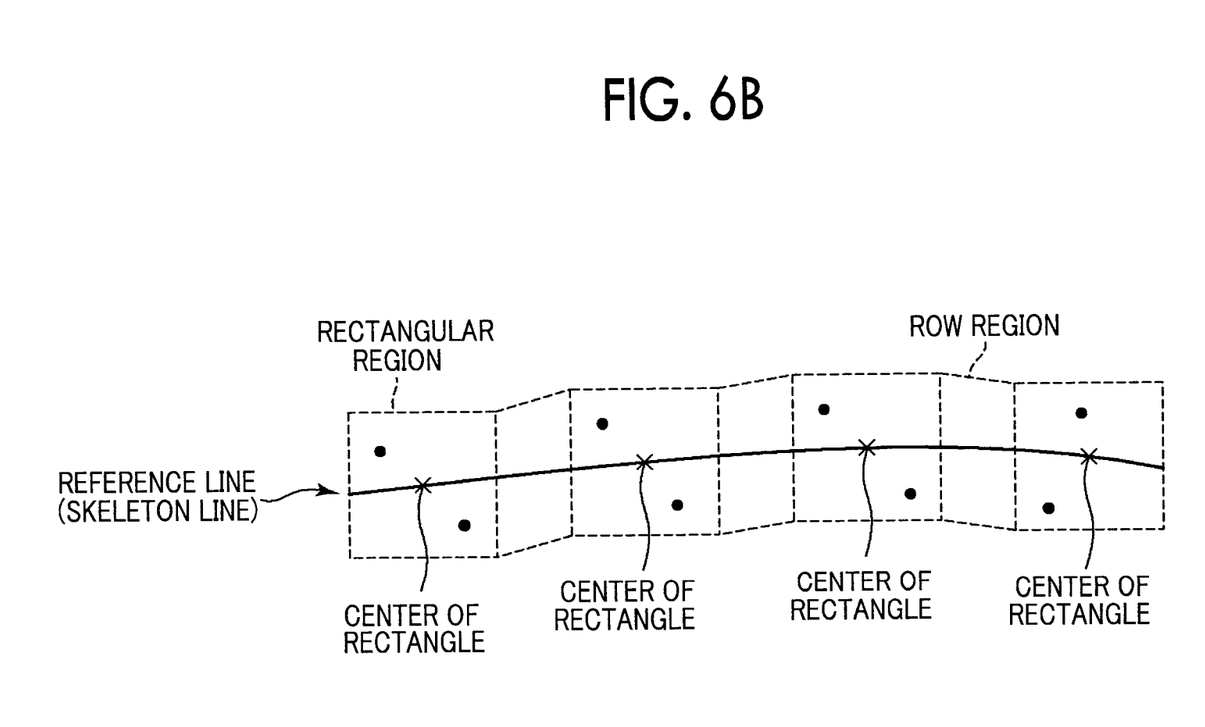
FIG. 6B is a diagram illustrating a second setting example of the reference line.

FIG. 6B is a diagram illustrating a second setting example of the reference line. In the example shown in FIG. 6B, a skeletal line of the arranged region formed by sequentially connecting centers of the bounding rectangles included in the arranged region is set as the reference line. When the centers of the bounding rectangles are connected to each other, they may be connected using any straight line or curve.

Next, a description will be made of a detailed example of the method of generating feature data on the basis of positional relationships between the reference line set for each arranged region and the feature points existing in the arranged region.

Figure 7A:
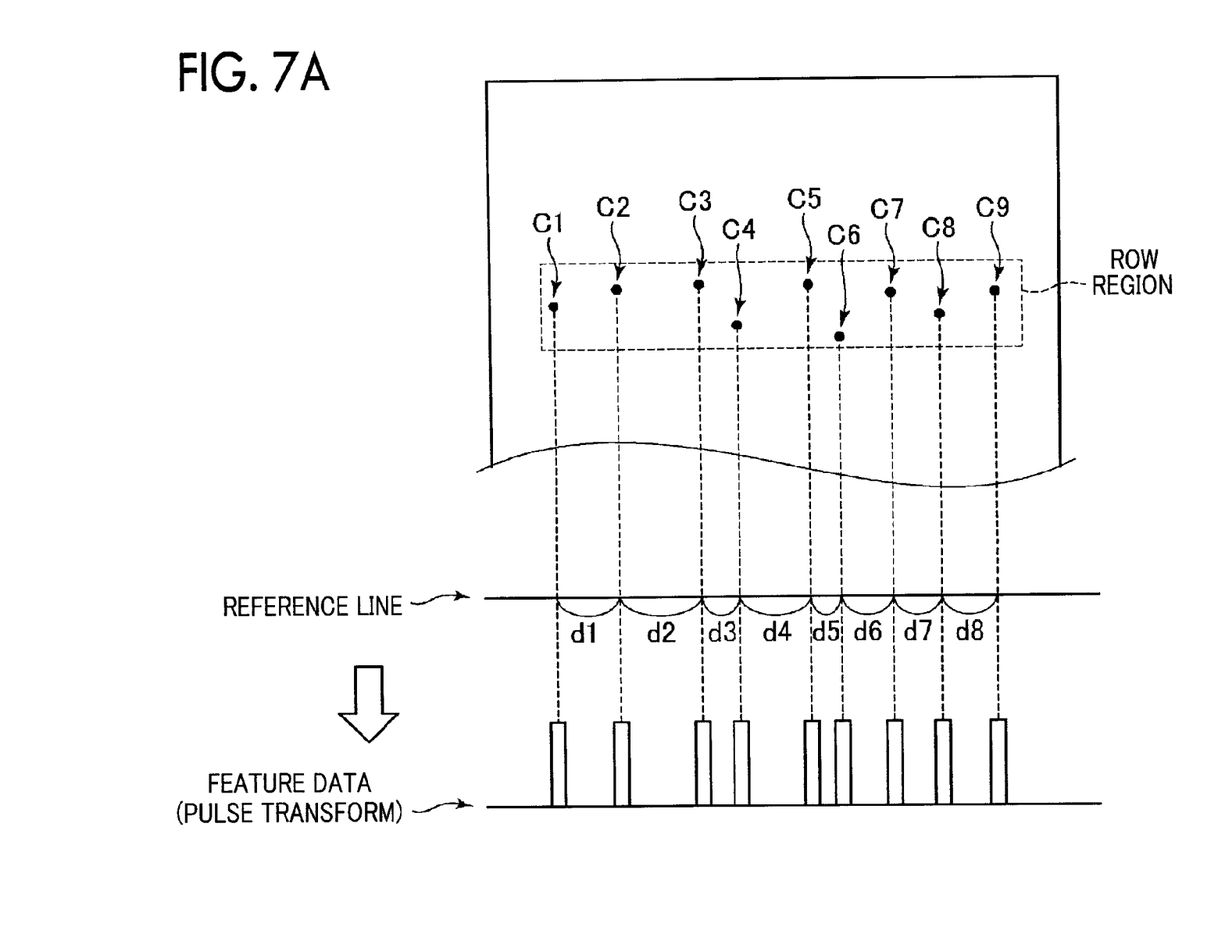
FIG. 7A is a diagram illustrating a first generation example of the feature data.

FIG. 7A is a diagram illustrating a first generation example of the feature data. As shown in FIG. 7A, distances ($d_1$, $d_2$, . . . , and $d_n$) between the feature points when the feature points ($c_1$, $c_2$, . . . , and $c_n$) are projected onto (vertically fall down to) the reference line are obtained with respect to the reference line set in the arranged region. In addition, as shown in FIG. 7A, pulse waveforms where waves (for example, rectangular waves) with a predefined height are disposed at the obtained distances ($d_1$, $d_2$, . . . , and $d_n$) between the feature points are generated, and the pulse waveforms generated in this way are used as feature data of the arranged region.

Figure 7B:
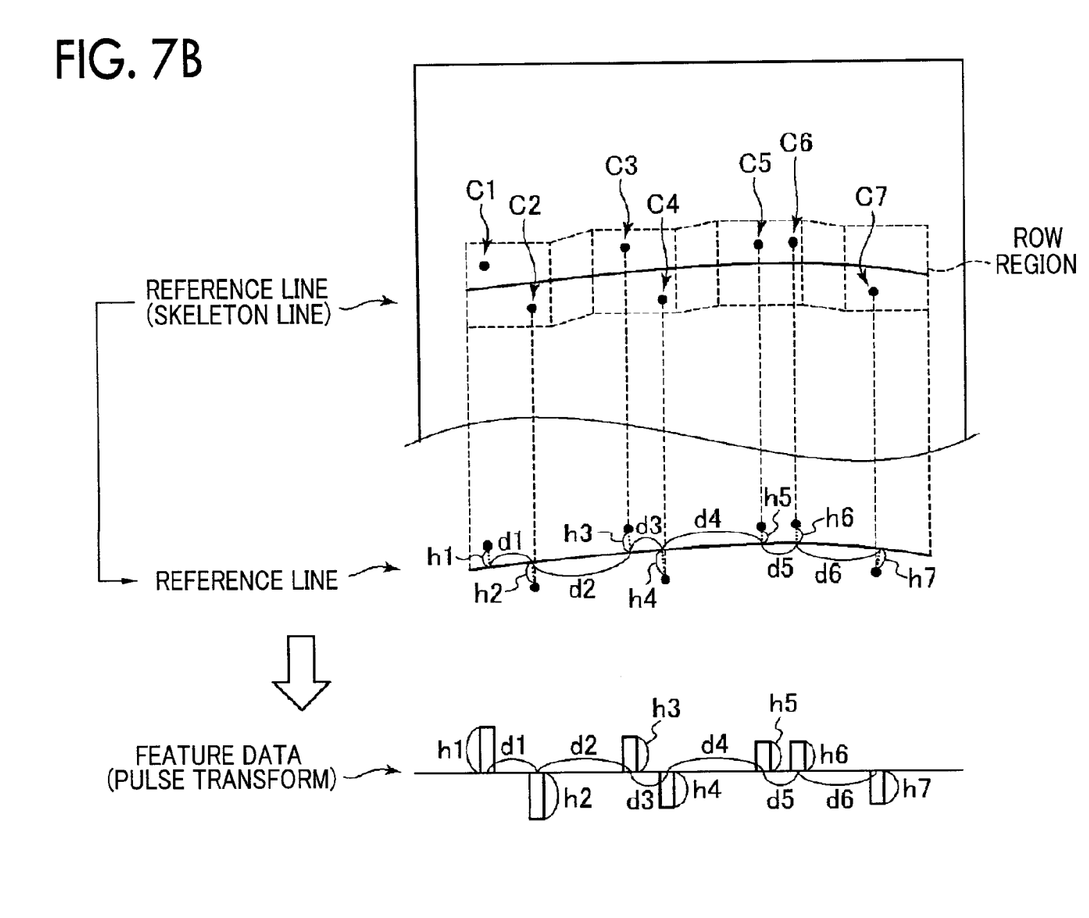
FIG. 7B is a diagram illustrating a second generation example of the feature data.

FIG. 7B is a diagram illustrating a second generation example of the feature data. As shown in FIG. 7B, with respect to the reference line set in the arranged region, distances ($h_1$, $h_2$, . . . , and $h_n$) between the feature points ($c_1$, $c_2$, . . . , and $c_n$) and the reference line and distances ($d_1$, $d_2$, . . . , and $d_n$) between the feature points when the feature points ($c_1$, $c_2$, . . . , and $c_n$) are projected onto (vertically fall down to) the reference line are obtained. In addition, as shown in FIG. 7B, pulse waveforms where waves (for example, rectangular waves) with a height converted from the obtained distances ($h_1$, $h_2$, . . . , and $h_n$) between the feature points and the reference line are disposed at the obtained distances ($d_1$, $d_2$, . . . , and $d_n$) of the feature points are generated, and the pulse waveforms generated in this way are used as feature data of the arranged region.

The feature data comparing unit 108 compares the feature data of the arranged region set in the first image with the feature data of the arranged region set in the second image. For example, the feature data comparing unit 108 calculates correlation values while sequentially varying relative positions between pulse waveforms generated for arranged regions ($A_i$ where i=1 to N) set in the first image and pulse waveforms generated for arranged regions ($B_j$ where j=1 to M) set in the second image, and obtains the maximum value of the calculated correlation values as a similarity of the arranged regions $A_i$ and $B_j$. At this time, the feature data comparing unit 108 also records correspondence relationships between the feature points of the arranged regions $A_i$ and $B_j$ when the correlation value is the maximum value.

Figure 8A:
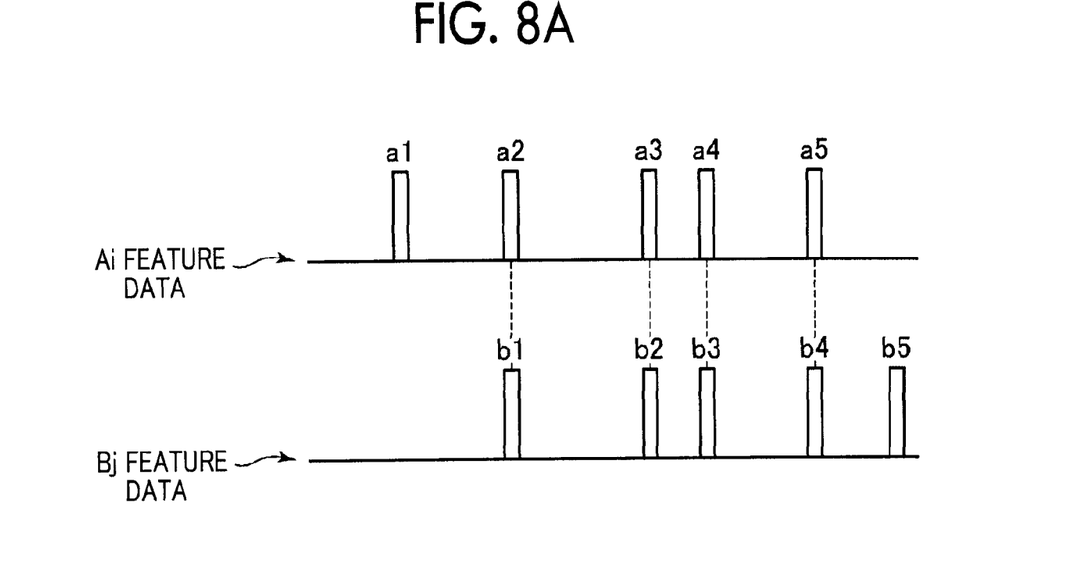
FIG. 8A is a diagram illustrating an example of the state where correlation between pulse waveforms is the maximum.

FIG. 8A shows an example of the state where correlation between the pulse waveforms generated in the first example (the example shown in FIG. 7A) is the maximum in each of the arranged region $A_i$ of the first image and the arranged region $B_j$ of the second image. In addition, it is assumed that the arranged region $A_i$ includes feature points ($a_1$, $a_2$, . . . , and $a_n$) and the arranged region $B_j$ includes feature points ($b_1$, $b_2$, . . . , and $b_m$). Here, when a correlation value between the pulse waveforms is the maximum at the position where the feature point $a_2$ corresponds to the feature point $b_1$, the correlation value and data ($a_2$, $b_1$), ($a_3$, $b_2$), ($a_4$, $b_3$) and ($a_5$, $b_4$) of corresponding points are recorded. Here, the data of the corresponding points may be generated by correlating feature points where position differences between the feature points of the arranged region $A_i$ and the feature points of the arranged region Bj are within a threshold value when a correlation value is the maximum.

Figure 8B:
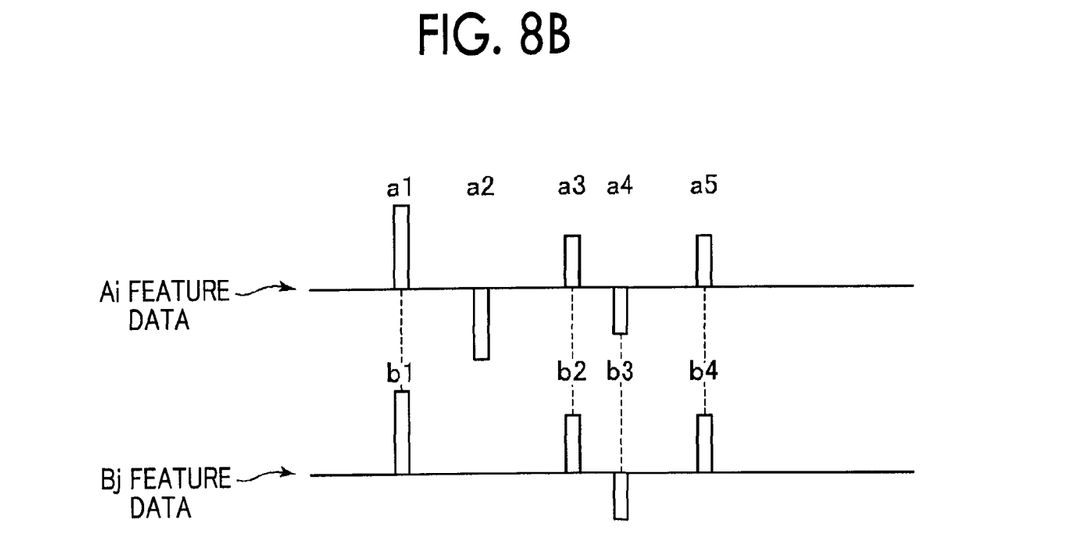
FIG. 8B is a diagram illustrating an example of the state where correlation between pulse waveforms is the maximum.

FIG. 8B shows an example of the state where correlation between the pulse waveforms generated in the second example (the example shown in FIG. 7B) is the maximum in each of the arranged region Ai of the first image and the arranged region Bj of the second image. In addition, it is assumed that the arranged region Ai includes feature points (a1, a2, . . . , and an) and the arranged region Bj includes feature points (b1, b2, . . . , and bm). Here, when a correlation value between the pulse waveforms is the maximum at the position where the feature point a1 corresponds to the feature point b1, the correlation value and data (a1=b1, a3=b2, a4=b3, and a5=b4) of corresponding points are recorded. Here, the data of the corresponding points may be generated by correlating feature points where position differences between the feature points of the arranged region Ai and the feature points of the arranged region Bj are within a threshold value when a correlation value is the maximum.

The corresponding point determining unit 110 selects a set where the maximum value of similarities calculated with regard to the arranged regions Ai (where i=1 to N) of the first image and the arranged regions Bj (where j=1 to M) of the second image is obtained. In addition, assuming that the selected set includes an arranged region Ak and an arranged region Bl, the corresponding point determining unit 110 specifies corresponding points (for example, as and bt, and the like) of the first image and the second image on the basis of data indicating corresponding points recorded for the arranged region Ak and the arranged region Bl. Thereby, the corresponding point determining unit 110 determines position coordinates at which a feature point at of the arranged region Ak is positioned in the first image and position coordinates at which a feature point bt of the arranged region Bl is positioned in the second image as corresponding points, respectively.

In addition, the corresponding point determining unit 110 may select plural sets in descending order in the magnitude of similarities calculated with regard to the arranged regions Ai (where i=1 to N) of the first image and the arranged regions Bj (where j=1 to M) of the second image, and may calculate a similarity when the first image and the second image overlap each other on the basis of data indicating corresponding points recorded for each selected set and select corresponding points recorded for a set where the calculated similarity is the maximum.

Next, the flow of a corresponding point specifying process performed by the image processing apparatus 10 will be described with reference to the flowchart shown in FIG. 9.

Figure 9:
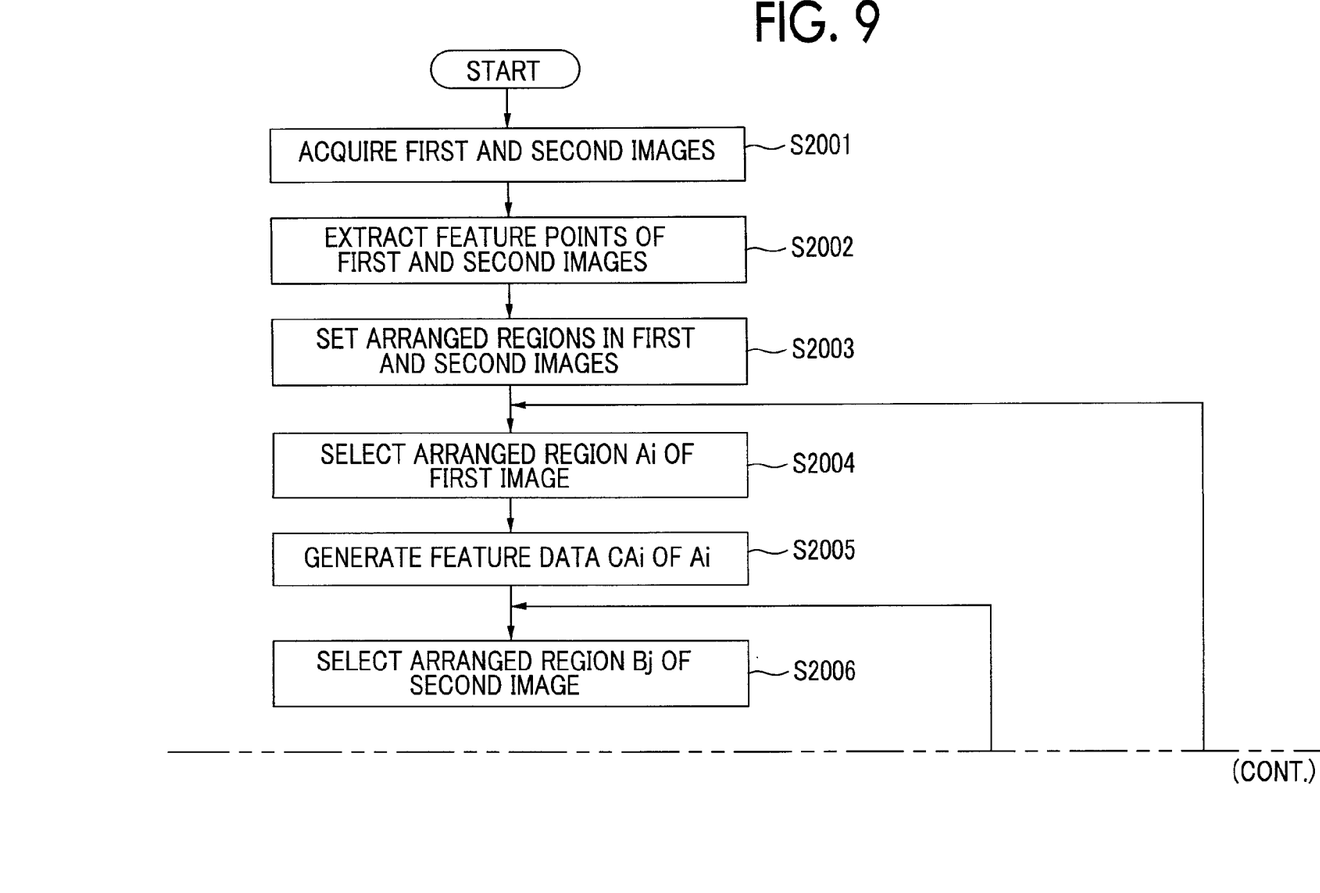
FIG. 9 is a flowchart illustrating an example of the corresponding point specifying process.

As shown in FIG. 9, the image processing apparatus 10 acquires the first image and the second image to be compared (S2001), and extracts feature points included in each of the first image and the second image (S2002).

The image processing apparatus 10 sets arranged regions in the first image and the second image in arrangement directions of the respective character strings (S2003). The setting process of the arranged region may be executed according to the flowchart shown in FIG. 4.

The image processing apparatus 10 selects one (Ai (an initial value of i is 1)) of arranged regions (A1 to An) set in the first image (S2004), and generates feature data CAi (waveform data) on the basis of positional relationships between a reference line set in the arranged region Ai and feature points ($a_{is}$ (where s=1 to Ns)) included in the arranged region Ai (S2005).

The image processing apparatus 10 selects one (Bj (an initial value of j is 1)) of arranged regions (B1 to Bm) set in the second image (S2006), and generates feature data CBj (waveform data) on the basis of positional relationships between a reference line set in the arranged region Bj and feature points ($b_{jt}$ (where t=1 to $M_t$)) included in the arranged region Bj (S2007).

The image processing apparatus 10 records the maximum value MAXij of correlation between both pieces of the waveform data, and corresponding points of the feature points $a_{is}$ and the feature points $b_{jt}$ at this time, while varying the relative position between the waveform data CAi and CBj (S2008).

The image processing apparatus 10 increments j (S2010) if j does not reach m (S2009: N), returns to step S2006, and determines whether or not i reaches n (S2011) if j reaches m (S2009: Y). Here, the image processing apparatus 10 sets j to 1 and increments i (S2012) if i does not reach n (S2011: N), and returns to step S2004. If i reaches n (S2011: Y), the image processing apparatus 10 specifies a set corresponding to the maximal arranged region Ai and arranged region Bj of the recorded maximum values MAXij (S2013), determines corresponding points of the first image and the second image on the basis of corresponding points recorded for the specified arranged regions Ai and Bj (S2014), and finishes the process.

Next, with reference to the flowchart shown in FIG. 10, a modified example of the corresponding point specifying process performed by the image processing apparatus 10 will be described.

Figure 10:
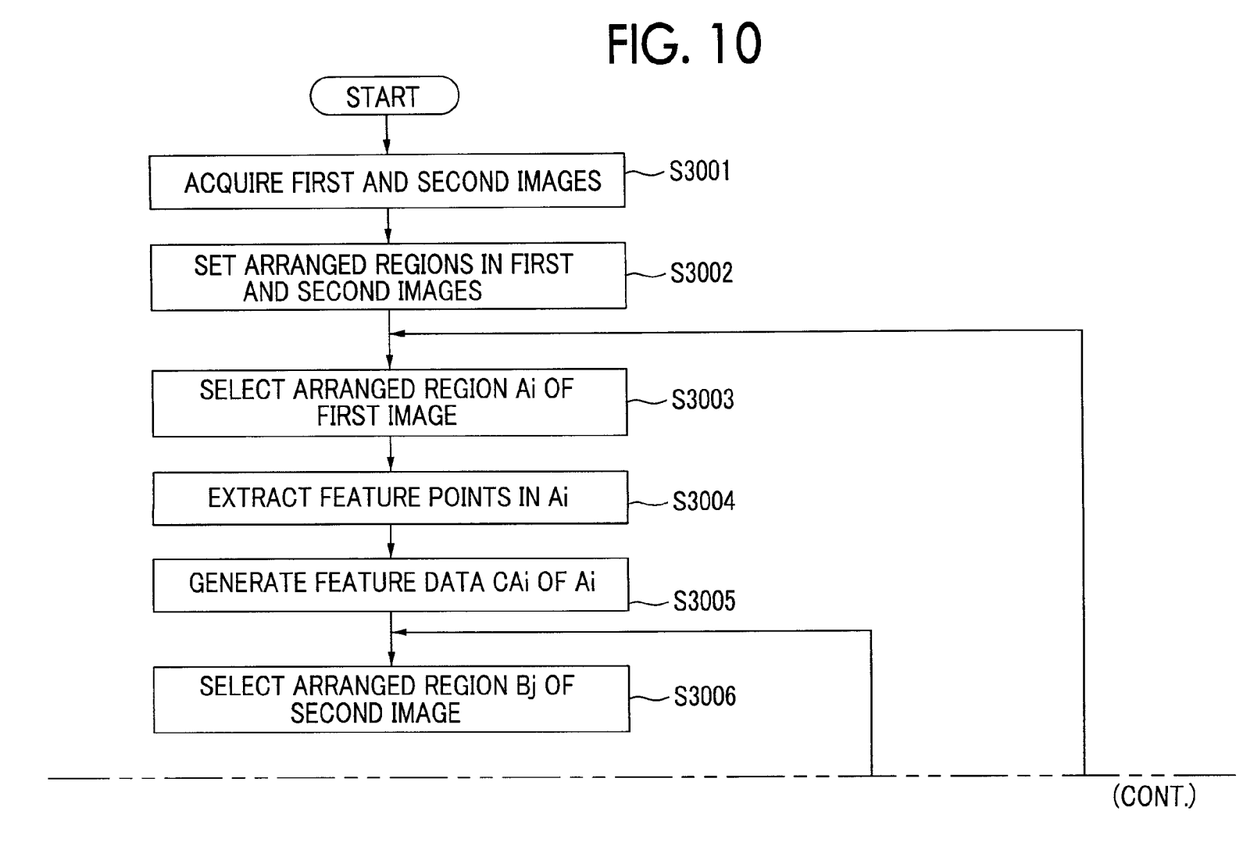
FIG. 10 is a flowchart illustrating a modified example of the corresponding point specifying process.

As shown in FIG. 10, the image processing apparatus 10 acquires the first image and the second image to be compared (S3001).

The image processing apparatus 10 sets arranged regions in the first image and the second image in arrangement directions of the respective character strings (S3002). The setting process of the arranged region may be executed according to the flowchart shown in FIG. 4.

The image processing apparatus 10 selects one (Ai (an initial value of i is 1)) of arranged regions (A1 to An) set in the first image (S3003), and extracts feature points ($a_{is}$ (where s=1 to Ns)) included in the arranged region Ai (S3004). In addition, the image processing apparatus 10 generates feature data CAi (waveform data) on the basis of positional relationships between a reference line set in the arranged region Ai and the feature points included in the arranged region Ai (S3005).

The image processing apparatus 10 selects one (Bj (an initial value of j is 1)) of arranged regions (B1 to Bm) set in the second image (S3006), and extracts feature points ($b_{jt}$ (where t=1 to $M_t$)) included in the arranged region Bj (S3007). In addition, the image processing apparatus 10 generates feature data CBj (waveform data) on the basis of positional relationships between a reference line set in the arranged region Bj and the feature points included in the arranged region Bj (S3008).

The image processing apparatus 10 records the maximum value MAXij of correlation between both pieces of the waveform data, and corresponding points of the feature points $a_{is}$, and the feature points $b_{jt}$ at this time, while varying a relative position between the waveform data CAi and CBj (S3009).

The image processing apparatus 10 increments j (S3011) if j does not reach m (S3010: N), returns to step S3006, and determines whether or not i reaches n (S3012) if j reaches m (S3010: Y). Here, the image processing apparatus 10 sets j to 1 and increments i (S3013) if i does not reach n (S3012: N), and returns to step S3004. If i reaches n (S3012: Y), the image processing apparatus 10 specifies a set corresponding to the maximal arranged region Ai and arranged region Bj of the recorded maximum values MAXij (S3014), determines corresponding points of the first image and the second image on the basis of corresponding points recorded for the specified arranged regions Ai and Bj (S3015), and finishes the process.

In the above-described image processing apparatus 10 according to the exemplary embodiment, corresponding rows (or columns) in the first image and the second image including character strings are specified, and corresponding points are determined based on the specified rows. Therefore, accuracy of specification of the corresponding points of the images including character strings is improved as compared with a case where feature points are not correlated with each other using positional relationships between the feature points included for each row.

In addition, correlation between row regions (or column regions) is performed so as to compare waveforms based on positional relationships between a reference line set in the row region (or column region) and feature points included in the row region (or column region), thereby reducing processing load. Further, in a case where a reference line is set along a skeleton line of a row region (or column region), even if the row region (or column region) is curved or rotated, accuracy of calculation of correlation between the row regions (or column region) is not decreased.

Of course, the present invention is not limited to the above-described exemplary embodiments. For example, a first image and plural second images may be designated, correlation between row regions (or column regions) set in the first image and row regions (or column regions) set in each of the plural second images may be calculated, a set of the row regions (or column regions) where the maximum correlation is calculated may be specified, and corresponding points of the first image and one selected from the plural second images may be determined based on correspondence relationships between feature points included in the specified row regions (or column regions).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an image acquisition unit that acquires a first image and a second image, each of the images including a character string;
   an extraction unit that extracts feature points included in each of the first image and the second image;
   a setting unit that sets, in each of the first image and the second image, at least one partial region including a plurality of characters that are continuously arranged in an arrangement direction of the character string; and
   a specification unit that compares positions of the feature points included in the at least one partial region set in the first image by the setting unit with positions of the feature points included in the at least one partial region set in the second image by the setting unit so as to specify at least one said at least one partial region set in the second image that corresponds to at least one said at least one partial region set in the first image, and to specify corresponding feature points in each of the specified partial regions.

2. The image processing apparatus according to claim 1, further comprising:
   a waveform generation unit that generates waveforms indicating features of the respective partial regions on the basis of positional relationships between reference lines set in the partial regions and the feature points included in the partial regions,
   wherein the specification unit specifies the at least one said at least one partial region set in the second image that corresponds to the at least one said at least one partial region set in the first image and specifies corresponding feature points in each of the specified partial regions on the basis of correlation between the waveforms generated by the waveform generation unit in relation to the at least one partial region set in the first image by the setting unit and the waveforms generated by the waveform generation unit in relation to the at least one partial region set in the second image by the setting unit.

3. The image processing apparatus according to claim 2, further comprising:
   a unit that sets the reference lines along skeleton lines of the partial regions.

4. The image processing apparatus according to claim 2, further comprising:
   a unit that sets the reference lines so as to be parallel to arrangement directions of the character strings included in the partial regions.

5. The image processing apparatus according to claim 1, wherein at least one of a shape and an orientation of each of the partial regions is at least partly determined by the arrangement direction of the character string included in the each partial region.

6. An image processing method comprising:
   acquiring, by an image acquisition unit, a first image and a second image, each of the images including a character string;
   extracting, by an extraction unit, feature points included in each of the first image and the second image;
   setting, by a setting unit, in each of the first image and the second image, at least one partial region including a plurality of characters that are continuously arranged in an arrangement direction of the character string; and
   comparing, by a specification unit, positions of the feature points included in the at least one partial region set in the first image with positions of the feature points included in the at least one partial region set in the second image so as to specify at least one said at least one partial region set in the second image that corresponds to at least one said at least one partial region set in the first image, and to specify corresponding feature points in each of the specified partial regions.

7. The image processing method according to claim 6, wherein at least one of a shape and an orientation of each of the partial regions is at least partly determined by the arrangement direction of the character string included in the each partial region.

8. A non-transitory computer readable medium storing a program causing a computer to function as:
   an image acquisition unit that acquires a first image and a second image, each of the images including a character string;
   an extraction unit that extracts feature points included in each of the first image and the second image;

a setting unit that sets, in each of the first image and the second image, at least one partial region including a plurality of characters that are continuously arranged in an arrangement direction of the character string; and a specification unit that compares positions of the feature points included in the at least one partial region set in the first image by the setting unit with positions of the feature points included in the at least one partial region set in the second image by the setting unit so as to specify at least one said at least one partial region set in the second image that corresponds to at least one said at least one partial region set in the first image, and to specify corresponding feature points in each of the specified partial regions.

9. A non-transitory computer readable medium according to claim 8, wherein at least one of a shape and an orientation of each of the partial regions is at least partly determined by the arrangement direction of the character string included in the each partial region.

* * * * *